April 4, 1939.  H. H. BASHOR  2,153,058
CHASSIS FRAME FOR HOUSE TRAILERS
Filed Oct. 21, 1937  2 Sheets-Sheet 1
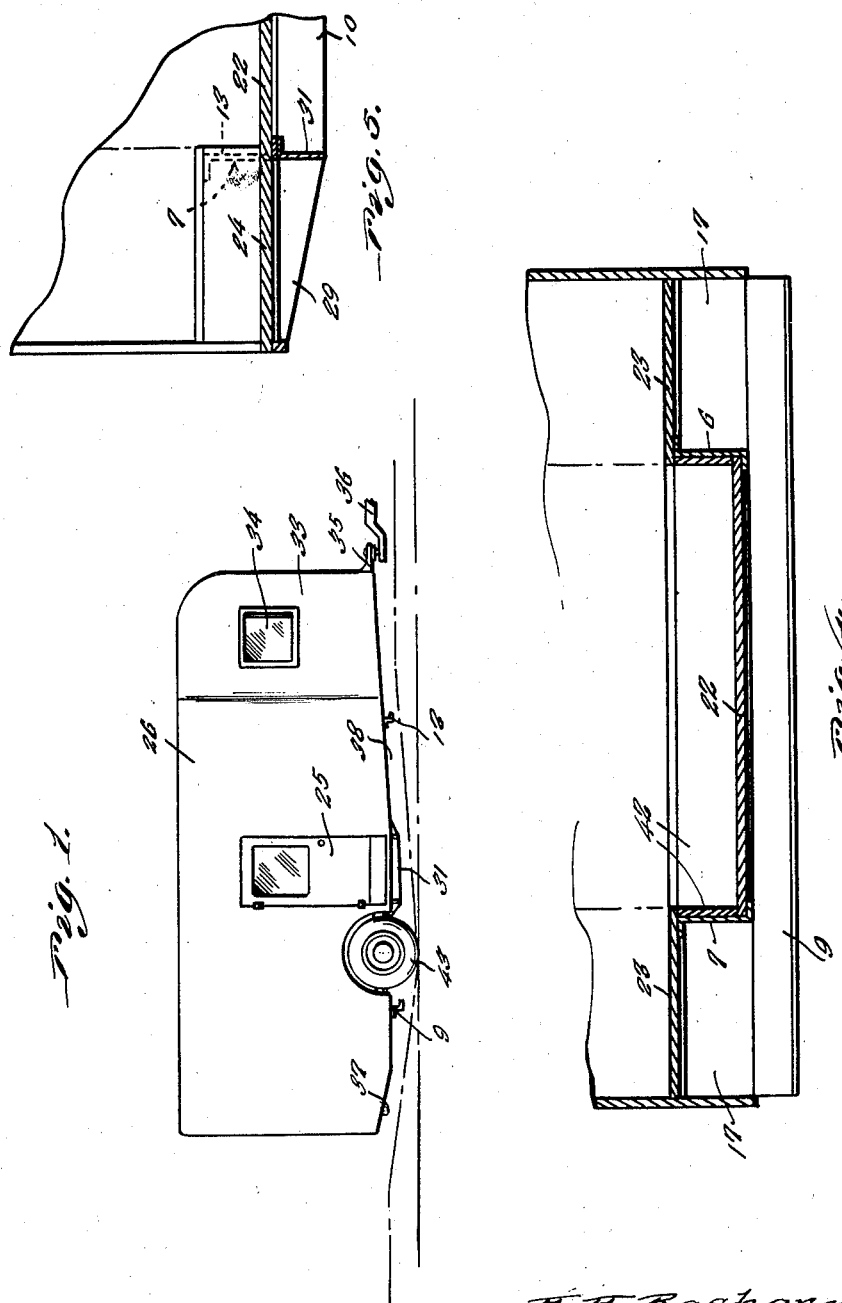
Inventor
*H. H. Bashor*
By *Clarence A. O'Brien*
*Hyman Berman*
Attorneys April 4, 1939.  H. H. BASHOR  2,153,058
CHASSIS FRAME FOR HOUSE TRAILERS
Filed Oct. 21, 1937   2 Sheets-Sheet 2
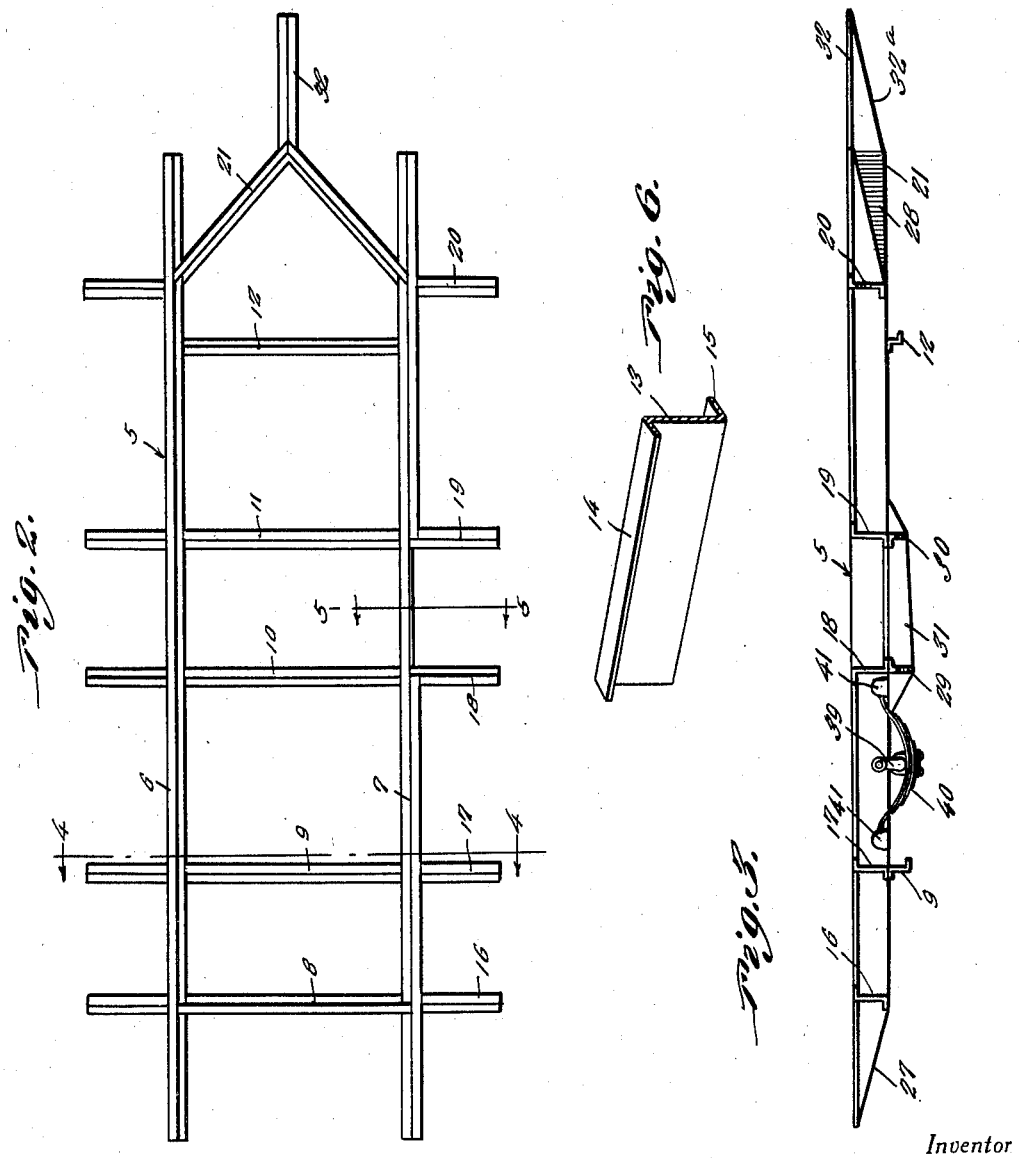
Inventor
H. H. Bashor
By Clarence A. O'Brien
Hyman Berman
Attorneys Patented Apr. 4, 1939

2,153,058

UNITED STATES PATENT OFFICE 2,153,058

CHASSIS FRAME FOR HOUSE TRAILERS

Harley H. Bashor, Albuquerque, N. Mex., assignor of one-half to Albert E. Buck, Albuquerque, N. Mex.

Application October 21, 1937, Serial No. 170,287

1 Claim. (Cl. 280—106)

This invention relates to trailers and more particularly house trailers; and an object of the invention is to provide an improved chassis frame structure for such type of trailers.

Among the objects of the present invention are:

1. To lower the total height of the trailer mounted on wheels and ready for use, while at the same time not lessen the clearance of the front and back ends of the trailer in crossing dips and depressions in the road travelled on account of the wheels dropping into such a depression and allowing the front and/or back end of the trailer to strike the roadway;

2. To provide such a chassis frame as will leave the inside distance from the floor to the ceiling of the trailer the same as is now standard practice in the building of trailers;

3. To provide such a frame whereby the floor level will be lowered to an extent that will do away with the necessity of a step for entering or leaving the trailer;

4. To provide a chassis frame, the members of which are fitly shaped as will permit them to serve as a foundation for the floor boards of the trailer;

5. To lower the center of gravity of the trailer weight thereby making the trailer less apt to upset or turn over when negotiating a curve or when being drawn over sloping roadways;

6. To lower the over-all height of the completed trailer and at the same time lessen wind resistance on the part of the trailer body;

7. To provide a chassis frame which will permit of the body of the trailer being so constructed as to allow for the placing of cabinets, cupboards, drawers, and other built-in features at a height that will reduce to a minimum stooping in order to gain access to such cabinets, etc.;

8. To provide a chassis frame which will have maximum strength with minimum weight; and 9. To provide a chassis frame the component members of which are of such a shape as will permit a wood floor and sub-floor to be attached thereto without resort to any special members or inserts for that purpose.

The invention together with its objects and advantages will be best understood from a study of the following description taken in connection with the accompanying drawings wherein:

Figure 1 is a side elevational view of a house trailer having a chassis frame constructed in accordance with the present invention.

Figure 2 is a top plan view of the chassis frame per se.

Figure 3 is a side elevational view of the chassis frame.

Figures 4 and 5 are detail sectional views taken substantially on the lines 4—4 and 5—5 respectively of Figure 2, but with the body of the trailer mounted on the frame and Figure 6 is a fragmentary perspective view of a frame member.

In accordance with the present invention the chassis frame indicated generally by the reference numeral 5 comprises a pair of longitudinal chassis bars 6, 7 and at intervals chassis bars 6 and 7 are connected together by cross bars 8, 9, 10, 11 and 12.

The bars 6 to 12 inclusive are substantially Z-shaped, or in other words are of the cross sectional shape clearly shown in Figure 6, each bar thus having a vertical web 13, an upper flange 14 extending laterally from the web 13 in one direction, and a lower flange 15 extending laterally from the web 13 in a direction opposite to the flange 14.

In connection with the bar 8 it will be noted that the same lies in substantially the same plane with the bars 6 and 7, that is to say, bar 8 extends between the bars 6 and 7 with the lower flange 15 of the bar 8 co-planar with the lower flange 15 of the bars 6 and 7 and the upper flange 14 of the bar 8 substantially co-planar with the top flanges 14 of the bars 6 and 7.

The bars 9 to 12, inclusive, however, are on a lower plane than the bar 8 and the bars 6 and 7, the bars 9 to 12 inclusive having their upper flanges 14 electrically welded to the lower flanges 15 of the bars 6 and 7.

The bar 9 at the respective opposite ends thereof projects laterally beyond the bars 6 and 7 while the bar 12 at its ends terminates substantially flush or in the plane of the webs 13 of the bars 6 and 7. It will also be noted that the web 13 of the bar 12 is narrower than the web of the bar 9.

Each of the bars 6 and 7 has projecting laterally therefrom what may be termed floor sills 16, 17, 18, 19, and 20.

The sills 16 to 20 inclusive are of the same cross-sectional shape as the bars 6 to 12 inclusive, and at one end the said sills 16 to 20 inclusive are electrically welded to the respective bars 6 and 7 with the top flanges of the sills co-planar with the top flanges of the bars 6 and 7 and the lower flanges of the sills co-planar with the lower flanges of the bars 6 and 7, the sills 16 to 19 inclusive being substantially in line with the bars 8 to 11 inclusive while the sills 20 are slightly in advance of the bar 12 as will be clear from a study of Figures 2 and 3.

Disposed between the bars 6 and 7 slightly inwardly from the forward ends of the bars is a substantially V-shaped cross bar 21 which in cross-sectional shape is substantially identical with the cross-sectional shapes of any of the bars 6 to 12 inclusive, and the V-shaped bar 21 is substantially in the same plane as the bar 8 and forms, together with the bar 8 and the intermediate portions of the bars 6 and 7, a substantially continuous frame structure within which are arranged the boards 22 forming a sub-flooring for the trailer body, the boards 22 being supported by the upper flanges 14 of the bars 9 to 12 inclusive and by the lower flanges 15 of the bars 6, 7, 8, and 21.

The sills 16 to 20 support floor boards 23, which boards 23 rest on the upper flanges 14 of the sills and the upper flanges of the bars 6 and 7 as best shown in Figure 4 so as to provide at opposite sides of the trailer a raised flooring. At one side of the trailer the raised flooring 23 extends in reverse directions from the sills 18 and 19, with the said sills 18 and 19 supporting on their lower flanges 15 a floor section 24 co-planar with the flooring 22 as shown in Figure 5. In this connection it will be noted that between the sills 18 and 19 the chassis bar 7 is notched or otherwise has portions of the webbing 13 and upper flange 14 removed so as to afford no obstruction to one entering or leaving the trailer, the floor section 24 thus forming a lateral extension or wing for the flooring 22, and the trailer body opposite this notched portion of the chassis bar 7 is provided with an entrance and exit door 25; the trailer body, which may be constructed as found desirable, and of any suitable design, being indicated generally by the reference numeral 26 and being shown in Fig. 1.

At the respective opposite ends thereof the chassis bars 6 and 7 have their lower edges inclined or disposed on a bias as at 27, 28 so as to provide suitable clearance to the end that should the wheels of the trailer body ride into a depression in the road surface the frame members at said ends wil clear the road surface. Consequently, under such conditions the body and frame of the trailer will not be subjected to hard contact with the road surface.

Also the sills 18 and 19 are braced relative to the chassis bars 6 and 7, and are further supported by L-shaped brace members 29, 30, and each of the L-shaped brace members 29, 30 is formed of angle iron and have their lateral flanges welded to the bottom flanges of the sills 18, 19, and chassis bars 7, 6.

In connection with the above it will be noted that the vertical flange of the brace member 30 is of less width than the corresponding flange of the brace member 29 so that the lower edge of the brace member 30 is disposed in a plane above the plane of the lower edge of the brace member 29.

The brace members 29, 30 are braced relative to one another through the medium of an angle bar 31, the upper flange of which is welded to the lower flange of the chassis bar 7. (See Figures 3 and 5.)

Also at the apex thereof the member 21 has projecting forwardly therefrom an extension member 32 that is of the same cross-sectional shape as the member 21, that is to say, is substantially Z-shaped in cross section, and at its terminal the member 21 fits in the angle between the converging wall portions 33 of the trailer body 26, it being noted that the trailer body 26 comes substantially to a point at the front thereof. Wall sections 33 of the trailer body 26 may be, and preferably are, as shown in Figure 1, equipped with windows 34.

The trailer body 26 at the forward end thereof also has extending therefrom a draft bar or tongue 35 through the medium of which the trailer body may be suitably connected to the hitch 36 of the lead vehicle.

As also is clearly shown in Figure 3, the member 32 has its lower edge disposed at an incline or on a bias as at 32a.

In connection with the above it will be noted that the walls of the trailer body 26 at their lower edges are inclined at the rear as at 37, and are also inclined as at 38 the inclined edges 38 beginning substantially at the forward side of the doorway 25 and continuing to the forwardmost end of the trailer body. With the edges 37, 38 thus inclined, it will be seen that sufficient clearance will be maintained between the body of the trailer and the ground even though the wheels 43 of the trailer may roll into a ditch or depression in the roadway.

The wheels 43 are mounted on suitable stub axles 39 which in turn are supported by springs 40 suitably suspended as at 41 from the chassis bars 6, 7 intermediate the sills 17, 18. (See Figure 3.)

Also, in accordance with the present invention, the webs 13 of the chassis bars 6 and 7 and of the bars 8 and 21, interiorly of the trailer, are covered with facings 42 of linoleum or similar material cemented to the webs of said members so that the webs of said members so faced form, as it were, a mop board.

It is thought that a clear understanding of the construction, utility and advantages of a chassis frame structure for house trailers embodying the features of the present invention will be had without a more detailed description.

Having thus described the invention what is claimed as new is:

A chassis frame for a house trailer comprising a pair of longitudinal chassis bars, a plurality of spaced cross bars connecting said longitudinal bars for co-operating therewith in supporting a sub-flooring of a trailer body, a plurality of sill bars formed on outer faces of the longitudinal bars and extending at right angles thereto and arranged in a plane above said cross bars for supporting flooring of the body in a plane above the sub-flooring and certain of said sills supporting an extension flooring for the sub-flooring, a V-shaped member connecting the longitudinal bars and arranged in a horizontal plane therewith and having an extension member integral therewith and extending beyond companion ends of said longitudinal bars.

HARLEY H. BASHOR.